United States Patent [19]

Warren

[11] 4,019,430
[45] Apr. 26, 1977

[54] VACUUM EGG LIFTING AND PENETRATING MEANS

[76] Inventor: William H. Warren, 729 S. Main St., Centerville, Mass. 02632

[22] Filed: July 9, 1975

[21] Appl. No.: 594,334

[52] U.S. Cl. .................................. 99/485; 99/352
[51] Int. Cl.² ........................................ A23P 1/00
[58] Field of Search ............ 99/352, 440, 485, 571, 99/577, 581, 582; 30/366, 368; 294/87 A, 64 R; 248/363

[56] References Cited

UNITED STATES PATENTS

| | | | |
|---|---|---|---|
| 1,987,336 | 1/1935 | Powell | 294/87 A |
| 2,798,757 | 7/1957 | Jackson | 294/64 R |
| 3,061,352 | 10/1962 | Hirt | 294/87 A |
| 3,139,300 | 6/1964 | Hirt | 294/65 |
| 3,270,661 | 9/1966 | Javan | 99/440 X |
| 3,301,290 | 1/1967 | Scalella | 99/571 |
| 3,411,432 | 11/1968 | Willett | 99/440 |
| 3,865,420 | 2/1975 | Warren | 294/64 R |

Primary Examiner—Harvey C. Hornsby
Assistant Examiner—Robert Pous
Attorney, Agent, or Firm—Holland, Armstrong, Wilkie & Previto

[57] ABSTRACT

An improved egg handling device is disclosed in which a number of egg lifting vacuum cups, mounted on a convenient support, are used both to transfer eggs and to punch the egg shells. The egg piercing system is incorporated with the transfer cups to provide for a simultaneous piercing and lifting of the eggs. A piercing needle is mounted within each vacuum cup in a position to pierce or puncture each egg shell while it is held within the cup by the vacuum lifting force.

8 Claims, 6 Drawing Figures

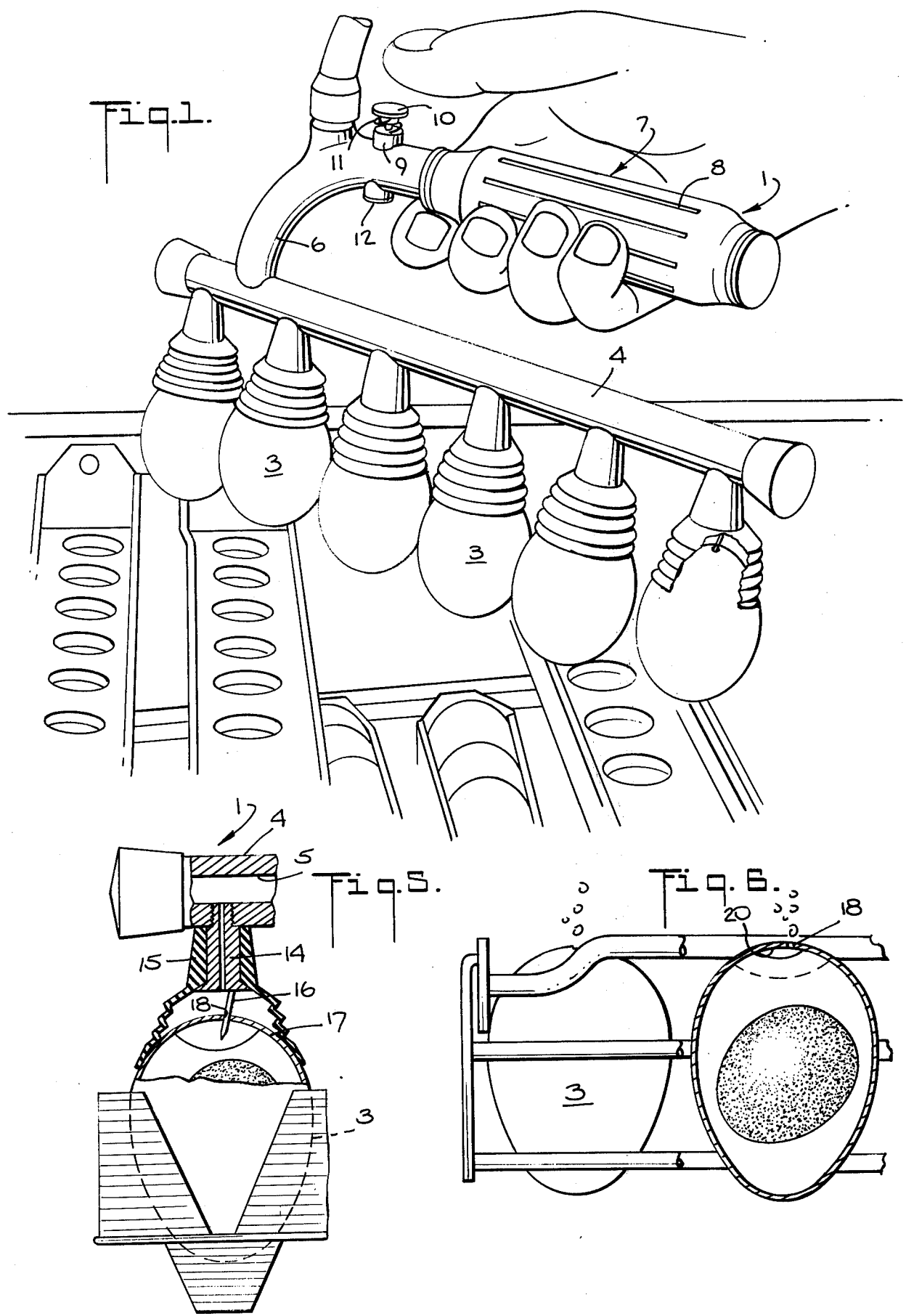

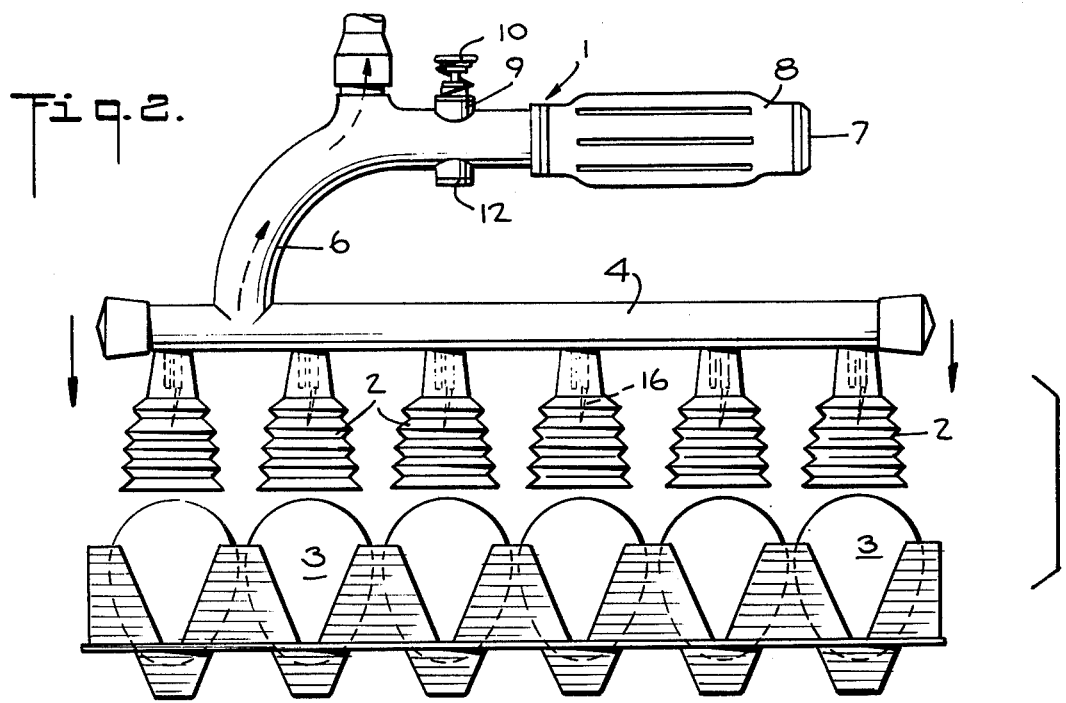
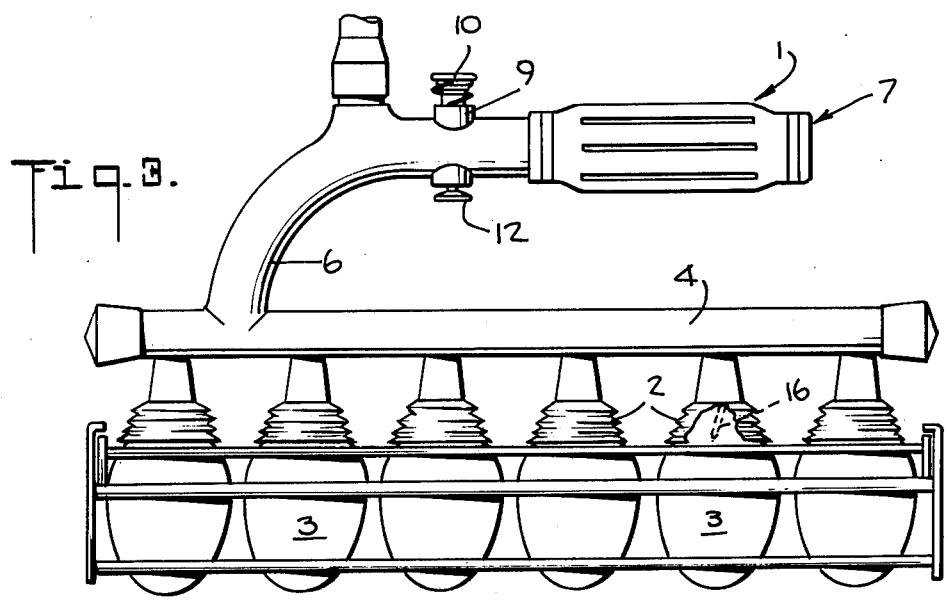
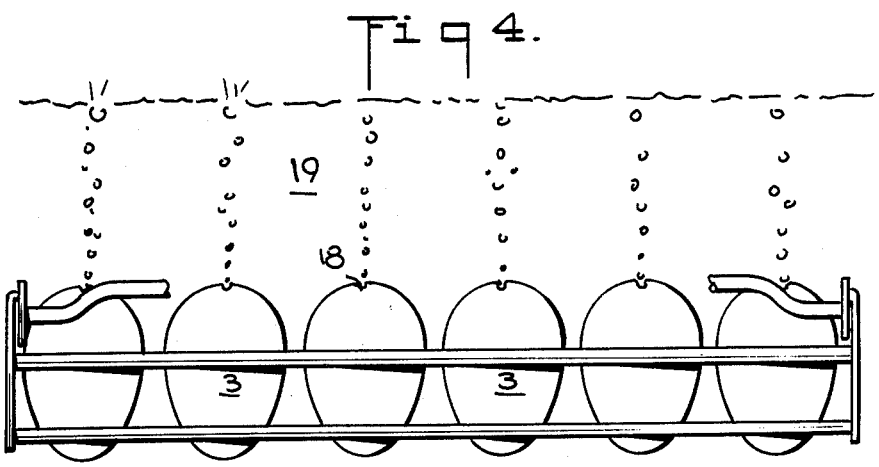

VACUUM EGG LIFTING AND PENETRATING MEANS

BACKGROUND OF THE INVENTION

The present invention relates to equipment for handling eggs and more particularly to a combined egg lifter or transfer device and an egg puncturing system.

Increasing use is being made of machinery for soft or hard cooking eggs. This machinery uses a variety of conveyor devices for carrying the eggs into and through the heating or cooking elements. It is necessary to provide for an efficient transfer device to load these egg feeding means rapidly and efficiently. One such device now in wide spread use is a vacuum egg lifter where an array of individual vacuum lifting egg cups are used to transfer the eggs from the supply trays or cartons to the heating or cooking means.

In the present invention, an improved egg lifter or transfer means is disclosed wherein the engagement or transfer of the eggs is accompanied by a simultaneous piercing or puncturing the eggs. This additional puncturing operation improves the heating or cooking operation by reducing the splitting of egg shells during the cooking to an insignificant amount, by reducing the tendency of eggs to float in a boiling liquid, and by providing more uniformly rounded eggs. While the advantages of punching prior to cooking are known, previous applications of the method have been done on an individual egg basis or by piercing devices performing the piercing operation as a separate step involving cumbersome inefficient and expensive separate egg handling and piercing operations.

Accordingly, an object of the present invention is to provide an improved egg lifter or transfer device.

Another object of the present invention is to provide an improved vacuum egg lifter for an egg transfer device incorporating an integral egg piercing means.

Another object of the present invention is to provide a combined egg transferring and piercing device.

Another object of the present invention is to provide an improved method of simultaneously transferring and piercing eggs.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawing, forming a part of the specification, wherein:

FIG. 1 is a perspective view of a preferred embodiment of an egg lifter in accordance with the present invention.

FIG. 2 is a side elevational view of the egg lifter and pricker of FIG. 1 in position above an egg tray as the pricker is moved to its egg lifting and pricking position.

FIG. 3 is a side elevational view corresponding to FIG. 2 illustrating the egg lifter depositing the transferred and pricked eggs into a row-type carrier.

FIG. 4 is a front elevational view illustrating the transferred and pricked eggs being heated.

FIG. 5 is an enlarged fragmentary view, partially in section, illustrating the vacuum cup and egg pricker.

FIG. 6 is an enlarged fragmentary front elevational view, partially in section, illustrating a heated egg in a cooking medium.

DESCRIPTION OF THE PREFERRED EMBODIMENT

The combined vacuum lifter and egg punching device will now be described in connection with a hand manipulated egg lifter. It is clear that a combination of vacuum lifter and pricker device is equally useful in a machine driven egg transfer mechanism of the automatic or semi-automatic type.

The egg lifter 1 includes a plurality of flexible hollow egg lifting cups 2. The cups 2 are shaped to receive and to form an air tight seal with the end of eggs 3. A preferred style of egg cup 2 has a bellows shape as illustrated, for example, in FIG. 5 to facilitate the seal. The egg cups 2 are arranged with the desired spacing in one or more rows with the interior of each egg cup 2 coupled to a source of vacuum through a suitable vacuum control.

The vacuum coupling or manifold system, as illustrated in the preferred embodiment, comprises a hollow rod 4 having a central vacuum conduit 5 connected through a hollow handle 6 to a pump or other source of vacuum by a convenient coupling. A gripping handle 7 is provided including a hand grip 8. A control device, which applies and releases the vacuum, comprises a control switch 9 whose operating button 10 opens an air outlet when depressed to release the vacuum force from the egg cup manifold by admitting air to the pump and to the vacuum manifold. In its normal raised position under the force of the coil spring 11, the air outlet 12 is closed coupling the pump or other vacuum source to the egg cup manifold causing the vacuum forces to be applied to the egg cups 2 so that the eggs 3 are forced into and held by the individual egg cups 2 during the punching and/or transfer. Each of the individual egg cups 2 is connected to a support rod 4 by a suitable coupling stud 14, as illustrated in FIG. 5, which also acts as a mounting for the cups 2 by engaging the mounting collar 15 on each egg cup 2.

Each of the studs 14 has a needle-like prick or punch 16 mounted on it in position to engage the shell 17 of an egg 3 held in an egg cup 2. The vacuum forces, as exerted on the eggs 3, are sufficient to force the eggs 3 upwardly against a punch 16 and to force the punch 16 through the egg shell 17 in the manner illustrated in FIG. 5. The punches 16 are proportioned to insure complete penetration of the egg shells 17 for the range of egg sizes being handled and a punch 16 which will penetrate the average egg about 3/32 inches will insure an adequate punching operation for a normal range of sizes of the eggs being handled. The vacuum for a particular lifter 1 is readily adjustable to obtain the necessary combination of lifting force and punching force. For a six egg lifter 1 of the general type illustrated, a vacuum force of ten inches has been found to be sufficient to punch the eggs without additional downward force being exerted by an operator. An lesser vacuum may be used which will be adequate for the egg support function. Where a minimal vacuum force is used, the punching operation may be completed by a slight downward pressure on the lifter 1 by the operator.

Unexpectedly, no loss of egg content has been found to occur even at the higher vacuum lifting forces, such as ten inches of vacuum. This result, although unexpected, may be explained by the face that the presence of a single pin-size puncture 18 only in the egg shell 17 prevents a loss of the egg contents such as would occur were a second aperture present in the egg shell 17. The single puncture hole 18 filled by a punch 16 during the transfer provides only a very limited means for an entry of air which necessarily must accompany a loss of egg contents.

FIGS. 4 and 6 illustrate the punctured eggs 3 after their transfer to a heating medium 19, such as a boiler. The expansion of the egg contents generates no shell splitting forces as the egg contents expand into the natural egg air cell space 20 during an escape of air through the shell puncture 18. The escape of air from the egg shell 17 reduces the tendency of the eggs to float in the cooker water and also permits the eggs to expand to a desirable rounded shape.

The above described pricking operation is effective regardless of the exact position of the eggs in the trays or carriers. A preferred position, however, is that illustrated where the large ends of the eggs are uppermost with the natural air cell space 20 presented to the punches 16. This arrangement of eggs is conveniently obtained in the transfer operation as eggs are conventionally arranged in this manner by loading devices when placed into the supply cartons or trays.

The combination of the vacuum egg holding forces with the egg punching needles provides an effective means for assuring a precise punching of a number of eggs in a row since the vacuum force will assure a firm seating or gripping of each egg against its own egg cup regardless of minor variations in the exact attitude or positioning of the lifter pricker device. The vacuum pricker device thus provides for an improved egg punching operation independently of the egg transfer step.

It will be seen that an improved combined vacuum egg lifting and punching operation and device has been described where a vacuum egg lifting force is combined with a punching action. This results in the elimination of a separate punching apparatus and a separate punching operation and also provides a more effective and efficient punching operation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having described my invention, I claim:

1. An improved vacuum egg handling means comprising the combination of:
    a vacuum support means for receiving and supporting eggs;
    means for connecting said support means to a source of vacuum;
    punch means positioned on said support means for punching an aperture in the shells of eggs held by said support means; and
    said connecting means including means for controlling the vacuum such that said eggs as a result of said vacuum are forced into engagement with said punch means.

2. A vacuum egg handling means as set forth in claim 1 in which said vacuum support means comprises a plurality of resilient and flexible hollow cup members having air outlets communicating with said connecting means.

3. A vacuum egg handling means as set forth in claim 2 in which said punch means comprises a needle-like punch member positioned within the vacuum cup means adjacent to said air outlet.

4. A vacuum egg handling means as set forth in claim 1 in which said vacuum support means comprises a hollow support member and a plurality of resilient and flexible cups mounted in a row on said member, and means for attaching each of said cups to said member including an air conduit coupling the interiors of said cups to the interior of said hollow support member.

5. A vacuum egg handling means as set forth in claim 4 in which said means for attaching said cups to said support member comprises a mounting stud for each of said cups including said air conduit and means for engaging the cups.

6. A vacuum egg handling means as set forth in claim 1 which further comprises a gripping handle positioned on said support means, and a vacuum release switch positioned adjacent to said handle and having an air outlet coupled to said connecting means, and valve means for opening said air inlet.

7. A vacuum egg handling means as set forth in claim 1 in which said vacuum support means comprises a plurality of resilient and flexible cups having bellows in the side walls of each cup.

8. A vacuum lifter as set forth in claim 1 which further comprises switch means in said connecting means for controlling the vacuum egg support force.

* * * * *